United States Patent [19] [11] 4,256,033
Poznanovic [45] Mar. 17, 1981

[54] METHOD FOR THE FRACTIONATION OF GREEN PLANTS FOR FODDER AND A DEVICE USED IN THE METHOD

[76] Inventor: Milenko Poznanovic, 14 rue du 14 Juillet, 67 980 Hangenbieten, France

[21] Appl. No.: 52,255

[22] Filed: Jun. 26, 1979

[30] Foreign Application Priority Data

| May 8, 1979 | [FR] | France | 79 12254 |
| Jun. 28, 1978 | [YU] | Yugoslavia | 1529/78 |
| Jun. 28, 1978 | [YU] | Yugoslavia | 1530/78 |

[51] Int. Cl.³ .................. A47J 19/02; B30B 15/34
[52] U.S. Cl. ........................ 100/37; 100/117; 100/139; 100/147; 100/223; 426/636; 426/807; 99/495
[58] Field of Search ............. 426/636, 807; 100/117, 100/147, 137, 139, 95, 223, 37, 39; 99/495; 266/83, 86

[56] References Cited

U.S. PATENT DOCUMENTS

| 2,930,314 | 3/1960 | Carlson | 100/147 |
| 3,092,017 | 6/1963 | French et al. | 100/117 |
| 3,111,082 | 11/1963 | Larsson et al. | 100/147 |
| 3,191,521 | 6/1965 | Hiller | 100/37 |
| 3,450,034 | 6/1969 | Ocker | 100/117 |
| 3,518,936 | 7/1970 | Bredeson | 100/117 |
| 3,847,075 | 11/1974 | Boshold | 100/223 X |
| 3,877,365 | 4/1975 | Berggren | 100/117 |
| 4,117,776 | 10/1978 | Hunt | 100/117 |
| 4,123,970 | 11/1978 | Quante | 100/223 X |

*Primary Examiner*—R. B. Penland

[57] ABSTRACT

A method is provided for splitting and extracting green plants, such as lucern, for fodder and preserving of the pulp. The method provides for separately gathering the juice and the pump with various percentages and at a desired rate for more judicious utilization of those components and in particular, a better valorization of proteins; and for preserving the pump in commercial fractions by a method of batch-compaction and of anaerobic storage, eliminating all dehydrations and thus exhibiting an appreciable savings of energy.

The method is characterized in that it includes a primary phase of crushing and breaking of stems without mixing of the cellulose and a secondary phase in which one realizes a definitive splitting to the desired degree. A device for using the method is also disclosed. The method and device have application in the agro-alimentary industries.

11 Claims, 4 Drawing Figures

METHOD FOR THE FRACTIONATION OF GREEN PLANTS FOR FODDER AND A DEVICE USED IN THE METHOD

The present invention relates to a method for the splitting and extracting of green plants for feed at an improved rate and a device for using said method.

The increasing costs of labor and transportation have progressively made the traditional techniques of ensilage and of natural drying less desirable with respect to dehydration and granulation.

Yet, these techniques of dehydration and granulation still present some significant inconveniences. For example, in spite of substantial decreases in the consumption of energy in the course of the last years for the operation of these techniques, the energy cost factor in the price of dehydrated products, particularly for animal feed, remains on the order of 30% of the net cost of the commercial product, and tends to grow with increases in the price of oil.

It is known that ruminants in fact use only a part of the proteins contained in the fodder so treated and conditioned. A considerable problem exists follows for a component which is missing in the feeding of monogastrics, and which unbalances the commercial balance of many countries by the necessary importation of soya cattlecakes or fishmeal, for example.

Finally, in the methods of known splitting, the maximum amount of extract is in the order of 28% of contained juice in the supplied mass.

The present invention provides a method of splitting green plants used in feeding and the eventual conditioning of pulp coupled with the following advantages:
—saving of energy of dehydration;
—obtaining splitting at improved fraction levels up to 50% and
being able to be modulated with regard to sought after result (for example bovids: milk production or meat production), thus providing a considerable gain in proteins; and
—the possibility of preserving the pulp obtained by the splitting.

According to the invention these results are obtained by a method for the splitting of green plants for feed characterized in that it includes a primary phase of crushing and of breaking of stems without mixing of the cellulose and a secondary phase in which one realizes a definitive splitting of the mass.

This provides the advantage in comparison with the methods of the old art of controlling the production of the phases according to the final desired result, that is to say according to the rate of desired splitting.

The rate of final splitting is variable and adaptable according to the nature of the plants so treated and the desired result. By way of example, for lucern, which is rich in proteins, it seems that the rate of splitting of 50/50 can be attained as being the most advantageous. Thus the pulp not only preserves the same nutritive power for the ruminants as the fresh or dehydrated lucern, but increases the yield of animal growth as a consequence of a better digestion of raw fats and cellulose.

According to a preferred way of using the method, it provides at the end of the second phase for a premastication of the pulp. This premastication facilitates a lesser expenditure of energy for the rumination and assimilation of foods by the animal and thus a notable improvement of the average daily development.

According to another essential characteristic, the juice extracted in the course of the primary and secondary phases undergoes an autofiltration through the solids treated in each of the phases, this autofiltration resulting in each instance from the establishment of a pressure gradient.

Preferably, when the possibility of conservation and of transporting of the pulp is sought, which is generally the case, the method according to the invention will be completed by a batch-compaction phase and a packaging in sacks, in order to obtain on one hand a reduction of volume of the pulp and on the other hand an anaerobic conservation, thus avoiding all degradation of the product.

With regard to the collected juice that is excess and a by-product in the envisioned use, it possesses a large amount of raw protein, namely 25 to 50% of dry weight, that is to say 2 to 3.5% of liquid weight and additionally includes some hydrocarbon compounds, mineral material and vitamins. This can be an advantageous substitute for fishmeal and soybean grains in animal feed. It can undergo diverse further known treatments, as for example desication, total or partial.

For using the method according to the invention, there is also disclosed a device consisting of a condensing unit having a primary press used to crush and break the stems comprising a rotor formed by a conical screw thread of variable profile and a second rotor adapted for combined rotational and axial movement with regard to the first rotor, the two rotors turning preferably in a nonsynchronous manner. The unit includes a secondary press of the same type as the primary press but in which the rotors turn preferably in a synchronous manner, the first rotor of the secondary press effecting the definitive splitting of the solids and a separation between the pulp and the juice, the second rotor of said secondary press being operative to provide the premastication of the pulp.

According to a preferred mode, as will be noted herein, one embodiment of pulp treatment includes essentially a press formed by a rotary cylinder with two or more compartments connected suitably for filling the compartments with pulp and for compressing the pulp in said compartments.

In the device proposed, one will be able to see that each of the primary and secondary presses function with a forced feeding. The desirability of successive presses is essentially that the presence of the first press clearly improves the rate of splitting being able to be attained by the second. And so it is included within this invention the use of a single press, for example of the type of the secondary press, in which the two phases of method could be operated simultaneously.

In the primary and secondary presses, the fed mass is pushed by the conical screws toward their narrowest ends by the axial movement of the rotors. Doing this, one creates in the mass a pressure gradient which causes the extracted juice to flow in the opposite direction from that of the pressure, that is to say in practice by autofiltering through the mass.

In order to obtain this result, an additional characteristic of the invention consists in providing an arrangement of longitudinal bars or strips on the internal walls of the gear cases housing the rotors of the primary and secondary presses. These bars are essentially for the function of:

—allowing a preferential flowing of extracted juice;
—facilitating the mixing of the mass; and
—permitting the autofiltration of juice through the mass.

One will understand the invention better with the help of the attached description of a preferred mode of realizing the ways of using the method of the invention and the attached sketches in which.

Figure 1:
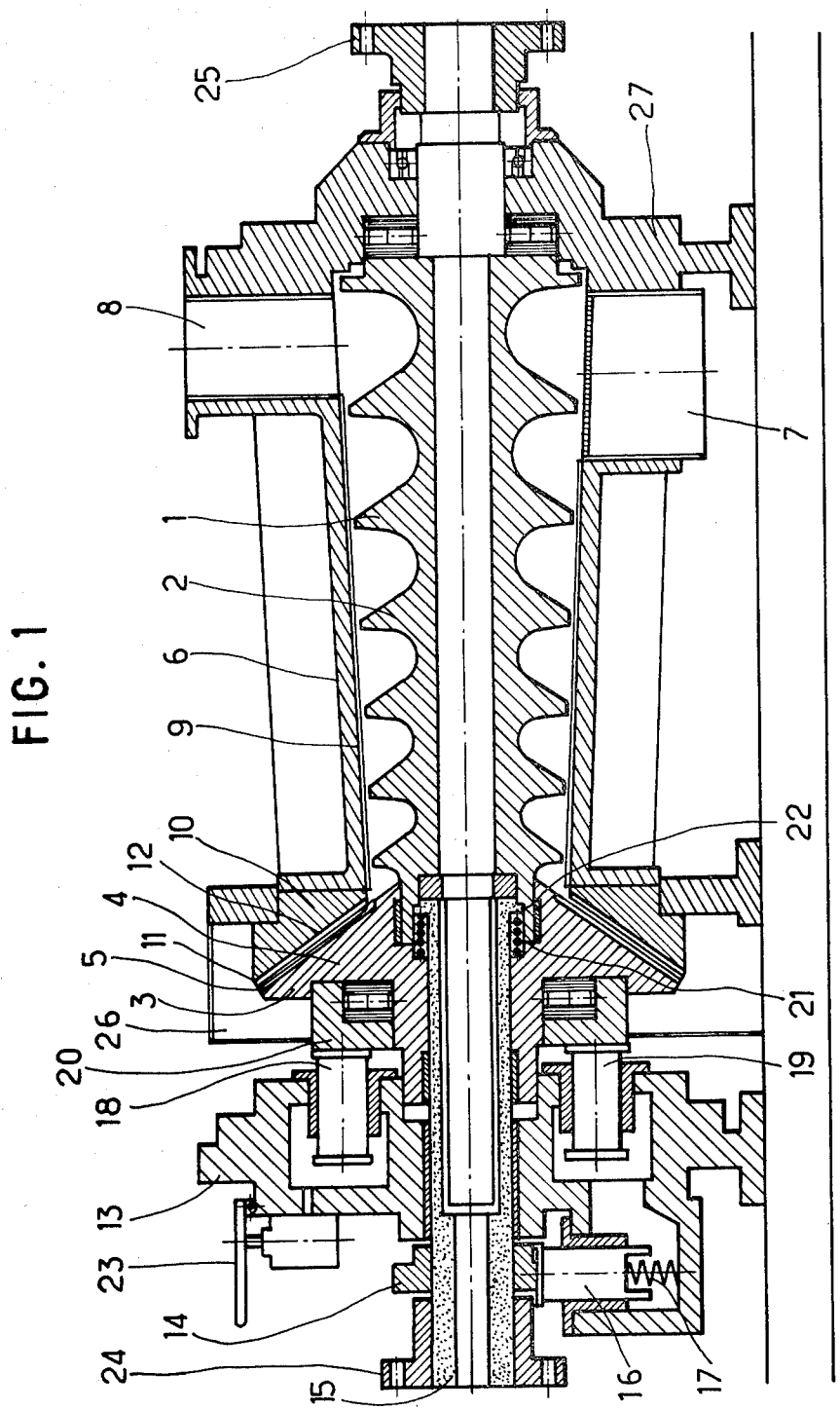
FIG. 1 is a longitudinal sectional view of a primary press.

The primary press represented in FIG. 1 is formed by a first rotor formed by a conical screw 2 with threads having a variable profile and by a second rotor 3 formed by a truncated conical plate 4 on the active surface of which are arranged some radial countersunk troughs of decreasing 5 section. The two rotors are propelled in nonsynchronous rotation, to act on the product being handled. Moreover, rotor 3 also is mounted for axial movement with its amplitude regulated in terms of the product being handled.

Some longitudinal bars 9 are arranged on the internal walls of conical gear case 6 which, while facilitating the preferential flow of juice, at the same time prevents rotation of the mass and juice with the screw 2.

In this way, the extracted juice filters itself through the mass and is gathered in conduit 7 as a liquid practically free of cellulose.

The rotor 3 which is driven with a combined movement of rotation and axial displacement along the length of the same axis, cooperates with a static ring 10 of corresponding truncated form, whose internal surface 11 opposite rotor 3 is provided with radial grooves 12 of decreasing sections corresponding to the countersunk troughs 5 of rotor 3.

As can be appreciated the respective forms of troughs 5 and grooves 12 can vary in terms of the sought after application. Thus they can be spiral, excentric composite, etc. . .

On the back surface of rotor 3 is arranged a vibration compartment 13 for axial movement of said rotor. It includes for example a control with cam 14 arranged on axle 15 of rotor 3 for rotation, therewith and a cam follower in the form of a piston plunger 16 urged into engagement with the cam by a spring 17. The piston provides for the hydraulical transmission of impulses at each passage of the cam 14 (it can moreover have several cams of this type), to a series of pistons 18, 19 arranged annularly around and against the abutment of support 20 of rotor 3. A compensation spring 21 arranged on the axle of rotor 3 and supported on an abutment 22 allows the maintaining of the movement by pushing back the rotor toward the back when cam 14 no longer acts on the piston plunger 16. It can also be seen that a device 23 can be provided to adjust or vary the possible play between rotor 3 and static ring 10 by injection or drawing-off the hydraulic oil in compartment 13.

The rotors 1 and 3 are equipped in a known well with drive couplings 24, 25 for fixed or variable speeds.

In the primary press, the mass is fed in inlet 8, the juice recovered at conduit 7 and the pulp structure of fibers is broken without mixing of cellulose to exit as a solid mass through compartment 26 after forcing between rotor 3 and the static ring 10 under the action of screw 2.

The press ensemble is mounted on a support 27.

Figure 2:
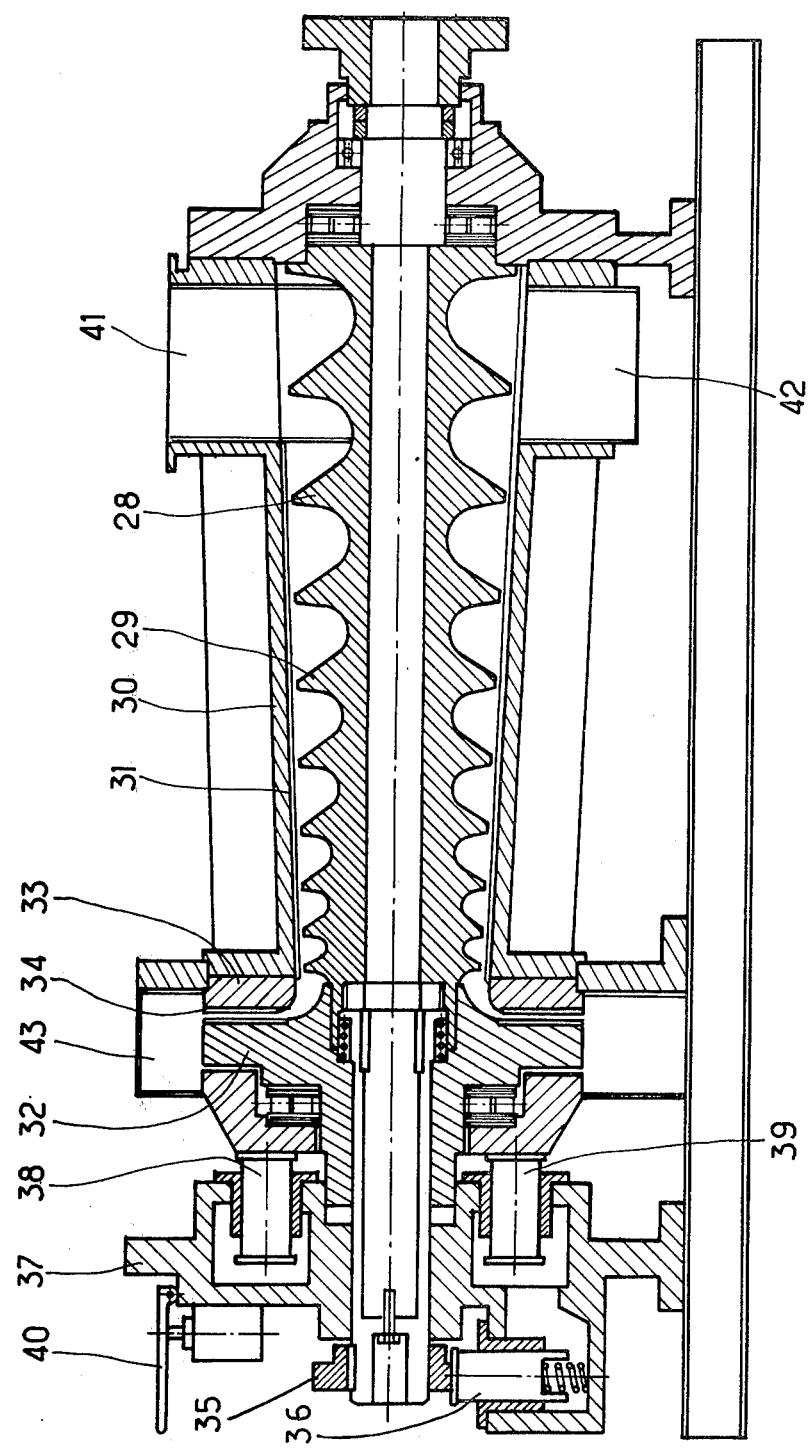
FIG. 2 is a longitudinal sectional view of a secondary press.

The secondary press such as represented in FIG. 2 is of the same type as the primary press, with some adaptations however. In particular, rotor 28 of the secondary press, attains compression rates that are notably higher. This is realized by the form of the screw itself and by the form of the rear rotor 32 whose flat surface regulates the rates of compression.

With respect to the axial movement of the rotor of the primary press, the movement of rotor 32 is of more reduced amplitude and of higher frequency. This movement is maintained by a device including a cam 35, a piston plunger 36, a compartment 37 and of pistons 38, 39 of the same manner as for the primary press. Likewise, compartment 37 is equipped with a device 40 for injection or of drawing-off oil for varying the operation, and consequently the size of the exit for the pulp between rotor 32 and the static ring 33. One can thus attain the rate of optimal splitting desired in terms of the treated product.

The product from the primary press is fed in inlet 41, the juice coming out at conduit 42, and the pulp definitively split and premasticated extrudes through compartment 43.

The pulp thus obtained is conditioned so as to allow a sufficient preservation of the fresh pulp for a long period of use. The conditioning must equally allow for the transporting and the stocking over long periods.

Figure 4:
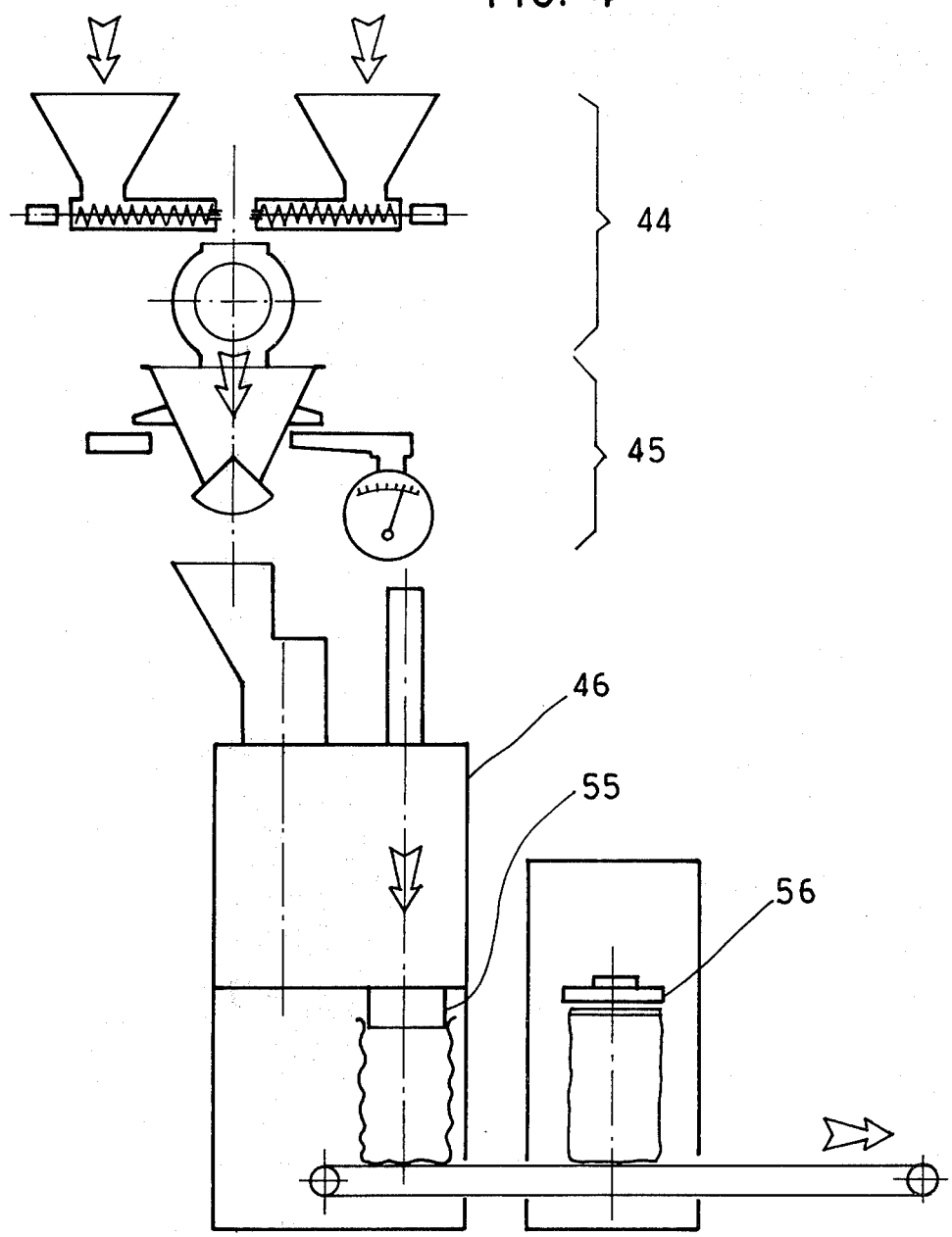
FIG. 4 is a diagrammatic illustration of an industrial conditioning unit.

In order to do this, there is provided a unit of specific conditioning below the secondary press, said unit as shown in FIG. 4 including successively:

an ensemble of treating and of mixing 44 with some feed components, according to the need;

a system of weighting 45;

a conditioning device through press 46, and putting into sacks 55;

a hermetically sealing device 56 for the sacks, eventually under vacuum; and an ensemble of automation of the different operations.

Figure 3:
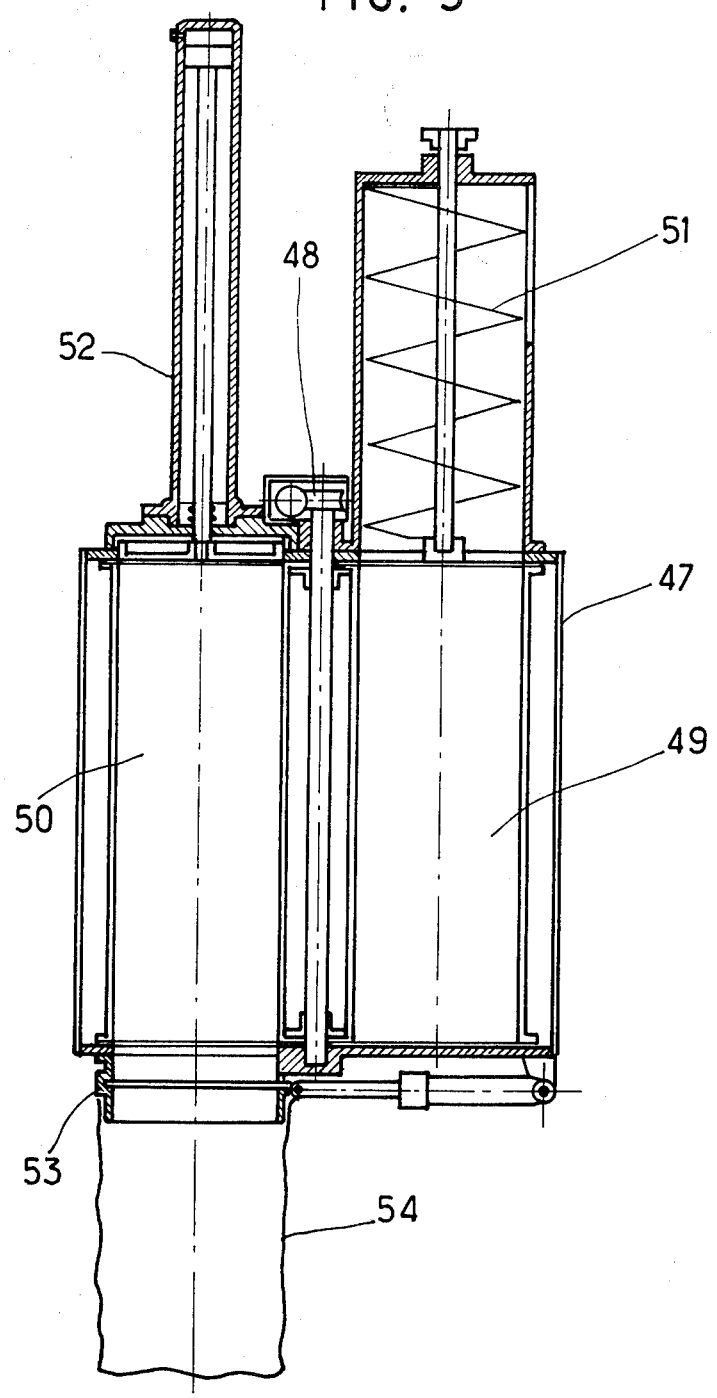
FIG. 3 is a longitudinal sectional view of a pulp conditioning press.

The various devices described above are of classic type and well known in the art, with the exception of the conditioning device through press 46 represented in FIG. 3.

This device is composed of a rotating cylinder 47 fed in rotation in a way known in art by a rotating jack 48. This cylinder includes two or several compartments 49, 50 crossing it from one part to another. The pulp is fed by a stuffing screw 51 into one of the compartments. The filling accomplished, the cylinder carries out an index rotation, for example of 180° for two compartments, and presents the filled compartment under a compression jack 52. The pressure is then carried out to the desired degree and the jack pushes the pulp pressed through a closing device 53 in a sack of plastic material 54 hooked in a known way under the closing device 53.

All the movements are operated automatically, the filling of a compartment takes place at the same time as the operation of pressing and evacuation of the other compartment.

I claim:

1. In a method for successive multiphase splitting and extracting of fluid-containing green plant material into an extracted fluid and a premasticated cellulosic pulp solid portion for fodder comprising primary and secondary splitting and extracting phases, each phase including the steps of compressing and crushing the fluid containing material while conveying it in a first direction along a feed path to extract a portion of the fluid therefrom and subsequently extruding the resultant solid portion from a secondary press, the improvement wherein the extruding of the solid portion includes a controlled further splitting of the solid portion and comprises the steps of subjecting said solid portion in the primary phase to a pulsating compressive force of controlled frequency and amplitude coupled with rotational shearing and subjecting the compressed solids in the secondary phase to further pulsating compression and shearing of reduced amplitude but of greater frequency than that of the primary phase to provide a substantially greater degree of compression in the secondary phase than in the primary phase thereby providing said premasticated cellulosic pulp.

2. The method of claim 1 wherein the fluid extracted during compressive conveying of the material flows along the feed path in a counterflow direction to said first direction to provide autofiltration of the fluid by counterflowing solids.

3. The method of claim 1 wherein the premasticated pulp from the secondary phase is conditioned by compressive compaction and is hermetically sealed in sacks.

4. A device for successive multiphase splitting and extracting of fluid-containing green plant material into an extracted fluid and premasticated cellulosic pulp solids for fodder comprising a primary press for crushing and breaking said green plant material and a secondary press for receiving the crushed material from the primary press and further crushing and breaking the material to provide said premasticated cellulosic pulp, each of said primary and secondary presses having first and second coaxial rotors, the first coaxial rotor of each press having a conical screw with threads of variable profile, the threads of said first coaxial rotor of the secondary press providing a greater degree of compression than those on said primary press, said second coaxial rotor of each press providing combined rotational and axial movement relative to said first coaxial rotor, said second coaxial rotor of said second press having an annular flat part cooperating with a static ring including a flat surface perpendicular to the axis of the rotors, and drive means for driving said second coaxial rotors independently of the material pushed thereagainst by the first rotors for applying a pulsating compressive force thereto of controlled frequency and amplitude coupled with rotational shearing thereof.

5. The device according to claim 4, wherein the two rotors of the primary press turn in a non-synchronous manner.

6. The device according to claim 4, wherein the two rotors of the secondary press turn in a synchronous manner.

7. The device according to claim 4, wherein the second rotor of the primary press is in truncated form and is driven by a combined rotational and axial movement against a static truncated ring.

8. The device according to claim 7, wherein the internal surface of the static truncated ring facing the truncated rotor is equipped with radial grooves of decreasing sections and the corresponding external face of the truncated rotor is equipped with radial countersunk troughs of decreasing section.

9. The device according to claim 4, wherein the first rotor of the primary press and the first rotor of the secondary press are each positioned in a gear case equipped with longitudinal bars.

10. The device according to claim 4, wherein the annular flat part of the second rotor includes radial grooves and the flat surface of the static ring includes corresponding radial troughs.

11. The device according to claim 4 further including a compactor for said premasticated pulp from the secondary press comprising a rotating cylinder with at least two moveable compartments, means for sequentially filling each compartment with said pulp and means for subsequently pressing said pulp in said filled compartment.

* * * * *